(12) United States Patent
Almog et al.

(10) Patent No.: US 9,170,816 B2
(45) Date of Patent: Oct. 27, 2015

(54) ENHANCING PROCESSING EFFICIENCY IN LARGE INSTRUCTION WIDTH PROCESSORS

(75) Inventors: Edan Almog, Jerusalem (IL); Nohik Semel, Kfar Saba (IL); Yigal Bitran, Ramat Hasharon (IL); Nadav Cohen, Lehavim (IL); Yoel Livne, Ramat Gan (IL); Eli Zyss, Ramat Hasharon (IL)

(73) Assignee: ALTAIR SEMICONDUCTOR LTD., Hod Hasharon (IL)

( * ) Notice: Subject to any disclaimer, the term of this patent is extended or adjusted under 35 U.S.C. 154(b) by 706 days.

(21) Appl. No.: 12/354,034

(22) Filed: Jan. 15, 2009

(65) Prior Publication Data

US 2010/0180102 A1  Jul. 15, 2010

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 9/32 | (2006.01) |
| G06F 9/30 | (2006.01) |
| G06F 9/38 | (2006.01) |

(52) U.S. Cl.
CPC ............ *G06F 9/325* (2013.01); *G06F 9/30065* (2013.01); *G06F 9/30185* (2013.01); *G06F 9/3853* (2013.01); *G06F 9/3867* (2013.01); *G06F 9/3885* (2013.01)

(58) Field of Classification Search
None
See application file for complete search history.

(56) References Cited

U.S. PATENT DOCUMENTS 4,566,063 A * 1/1986 Zolnowsky et al. .......... 712/241
6,052,771 A    4/2000 Heller, Jr. et al.

(Continued)

FOREIGN PATENT DOCUMENTS

EP    1039375 A1    9/2000
JP    2006252440 A    9/2006

(Continued)

OTHER PUBLICATIONS

Knijnenburg; Flattening VLIW code generation for imperfectly nested loops; 1998.*

(Continued)

*Primary Examiner* — Corey S Faherty
(74) *Attorney, Agent, or Firm* — D. Kligler I.P. Services Ltd.

(57) ABSTRACT

A processor includes one or more processing units, an execution pipeline and control circuitry. The execution pipeline includes at least first and second pipeline stages that are cascaded so that program instructions, specifying operations to be performed by the processing units in successive cycles of the pipeline, are fetched from a memory by the first pipeline stage and conveyed to the second pipeline stage, which causes the processing units to perform the specified operations. The control circuitry is coupled, upon determining that a program instruction that is present in the second pipeline stage in a first cycle of the pipeline is to be executed again in a subsequent cycle of the pipeline, to cause the execution pipeline to reuse the program instruction in one of the pipeline stages without re-fetching the program instruction from the memory.

32 Claims, 3 Drawing Sheets

(56) References Cited

U.S. PATENT DOCUMENTS

| | | | |
|---|---|---|---|
| 6,076,159 A * | 6/2000 | Fleck et al. | 712/241 |
| 6,085,315 A * | 7/2000 | Fleck et al. | 712/241 |
| 6,247,125 B1 | 6/2001 | Noel-Baron et al. | |
| 6,598,155 B1 | 7/2003 | Ganapathy et al. | |
| 6,810,475 B1 | 10/2004 | Tardieux | |
| 6,832,306 B1 | 12/2004 | Ganapathy et al. | |
| 7,571,305 B2 * | 8/2009 | Piry et al. | 712/241 |
| 2003/0177340 A1 | 9/2003 | Janik et al. | |
| 2007/0014357 A1 | 1/2007 | Jeon | |
| 2008/0148020 A1 | 6/2008 | Luick | |

FOREIGN PATENT DOCUMENTS

| | | | |
|---|---|---|---|
| JP | 2007257349 A | 10/2007 | |
| WO | 2006117562 A1 | 11/2006 | |

OTHER PUBLICATIONS

Yang et al.; Power-efficient Instruction Delivery through Trace Reuse; 2006; ACM.*

Weiss et al.; Dynamic Codewidth Reduction for VLIW Instruction Set Architectures in Digital Signal Processors; Apr. 2002.*

International Application PCT/IB2009/055923 Search Report dated Apr. 23, 2010.

European Patent Application # 09838186.6 Search Report dated Apr. 25, 2012.

CN Application # 200980154584.5 Office Action dated Apr. 24, 2013.

JP Application # 2011-545806 Office Action dated Nov. 13, 2013.

* cited by examiner

ENHANCING PROCESSING EFFICIENCY IN LARGE INSTRUCTION WIDTH PROCESSORS

FIELD OF THE INVENTION

The present invention relates generally to processor architectures, and particularly to methods and systems for enhancing processing efficiency in processors.

BACKGROUND OF THE INVENTION

Processors, such as Digital Signal Processors (DSPs), usually store program instructions in an instruction memory and fetch the instructions from memory in order to execute them. Some processors reduce the number of instructions fetched from the instruction memory using various caching mechanisms, which temporarily cache previously-used instructions.

SUMMARY OF THE INVENTION

Embodiments of the present invention provide a processor, including:
one or more processing units;
an execution pipeline, which includes at least first and second pipeline stages that are cascaded so that program instructions, specifying operations to be performed by the processing units in successive cycles of the pipeline, are fetched from a memory by the first pipeline stage and conveyed to the second pipeline stage, which causes the processing units to perform the specified operations; and
control circuitry, which is coupled, upon determining that a program instruction that is present in the second pipeline stage in a first cycle of the pipeline is to be executed again in a subsequent cycle of the pipeline, to cause the execution pipeline to reuse the program instruction in one of the pipeline stages without re-fetching the program instruction from the memory.

In some embodiments, the execution pipeline includes N pipeline stages, and the control circuitry is coupled to determine that the program instruction is to be executed again by determining that the program instruction is contained in a program loop having less than N of the program instructions.

In another embodiment, the control circuitry is coupled to cause the execution pipeline to reuse the program instruction by copying the program instruction from the second pipeline stage to the first pipeline stage. In an alternative embodiment, the control circuitry is coupled to cause the execution pipeline to reuse the program instruction by causing the execution pipeline to retain the program instruction in at least the second pipeline stage for execution at the subsequent cycle. In an embodiment, the control circuitry is coupled to cause the execution pipeline to reuse the program instruction by inhibiting the execution pipeline from fetching the program instruction from the memory.

In some embodiments, the one or more processing units include multiple processing units that operate concurrently with one another, each given program instruction specifies a configuration of the multiple processing units to be applied when executing the given program instruction, and the processor further includes interconnection circuitry, which is coupled to configure the multiple processing units in each given program instruction responsively to the respective configuration. The interconnection circuitry may be coupled to sense an output of one or more of the processing units, and to configure the multiple processing units responsively to a condition that is defined over the sensed output. In an embodiment, the interconnection circuitry is coupled to configure a given processing unit by setting at least one attribute selected from a group of attributes consisting of activation/deactivation of the given processing unit, selection of one or more sources of data input to the given processing unit, and selection of an operation to be performed by the given processing unit.

In a disclosed embodiment, at least one of the processing units includes an internal memory holding an internal data vector including multiple elements, and processing logic, which is coupled to cycle over the vector elements and to operate on the cycled vector elements. In another embodiment, at least one of the processing units includes an input and an output, and is coupled to accept data at the input, to delay the data and to produce the delayed data at the output for processing by another processing unit.

In some embodiments, the processor includes temporary storage memory, and arbitration circuitry, which is coupled to stall the execution pipeline responsively to identifying a given program instruction containing two or more requests by respective two or more processing elements to access a given resource, to store in the temporary storage memory respective data specified by the requests, to allow the two or more processing elements to access the given resource while the execution pipeline is stalled, and to store in the temporary storage memory respective results returned from the resource in response to the requests. In an embodiment, the resource includes a shared memory. The processing elements may include one or more of the processing units. One or more of the processing elements may be external to the processor.

There is additionally provided, in accordance with an embodiment of the present invention, a computing method, including:
operating one or more processing units;
operating an execution pipeline, which includes at least first and second pipeline stages that are cascaded so that program instructions, specifying operations to be performed by the processing units in successive cycles of the pipeline, are fetched from a memory by the first pipeline stage and conveyed to the second pipeline stage, which causes the processing units to perform the specified operations;
determining that a program instruction that is present in the second pipeline stage in a first cycle of the pipeline is to be executed again in a subsequent cycle of the pipeline; and
causing the execution pipeline to reuse the program instruction in one of the pipeline stages without re-fetching the program instruction from the memory.

The present invention will be more fully understood from the following detailed description of the embodiments thereof, taken together with the drawings in which:

DETAILED DESCRIPTION OF EMBODIMENTS

Overview

In many processors, fetching program instructions from an instruction memory draws a considerable amount of electrical power. The power consumed by instruction fetch operations often dominates the overall power consumption of the processor, especially in processors having large instruction widths.

Embodiments of the present invention that are described hereinbelow provide methods and systems for reducing the number of program instructions that are fetched from the instruction memory in processors having pipelined architectures. In a pipelined architecture, the processor comprises an execution pipeline having two or more pipeline stages that fetch, decode and cause execution of program instructions.

The methods and systems described herein exploit the fact that an instruction, which is currently intended for fetching, may already be present in the execution pipeline. In some embodiments, the processor comprises control circuitry, which determines that a previous instance of a program instruction that is intended for fetching is already present in the execution pipeline, and causes the pipeline to reuse the existing instruction instead of re-fetching it from the instruction memory.

A common scenario in which instructions can be reused occurs when the processor executes a program loop that is shorter than the pipeline depth (i.e., when the number of instructions in the loop is smaller than the number of pipeline stages). When executing the second or higher iteration of such a short loop, program instructions from previous loop iterations are already flowing through the pipeline. In some embodiments, the control circuitry identifies instructions that are part of short loops, and causes the processor to reuse these instructions within the pipeline without having to access the instruction memory. A given instruction can be reused, for example, by copying it to the input of the pipeline or by causing the pipeline to hold the instruction at the same position for an additional clock cycle.

Typically, reusing an instruction within the execution pipeline draws considerably less power than fetching the instruction from the instruction memory. Therefore, the disclosed methods and systems provide a significant reduction in power consumption in comparison with known techniques. The reduction in power consumption that is achievable by the disclosed techniques typically depends on the ability to program various kinds of software tasks using short program loops. Several examples of hardware mechanisms that enhance the ability of a processor to treat different software tasks in terms of short loops are described herein.

Unlike some known instruction caching techniques, which cache previously-used instructions in a dedicated memory, the methods and systems described herein use the instructions that inherently flow through the existing pipeline stages, and do not require additional memory elements for caching instructions. Most known instruction caching schemes are typically aimed at reducing access latency and require a relatively large memory space to achieve this goal. As such, these schemes often have little or no impact (and sometimes an adverse impact) on the power consumption of the overall instruction fetch scheme. Thus, the disclosed methods and systems are beneficial in both cached and non-cached instruction processors. Moreover, in contrast to caching techniques, the reuse of program instructions enabled by the disclosed methods and systems, as well as the resulting power saving for a specific program code section, are fully deterministic rather than statistical, and can easily be anticipated and planned by the programmer.

System Description

Figure 1:
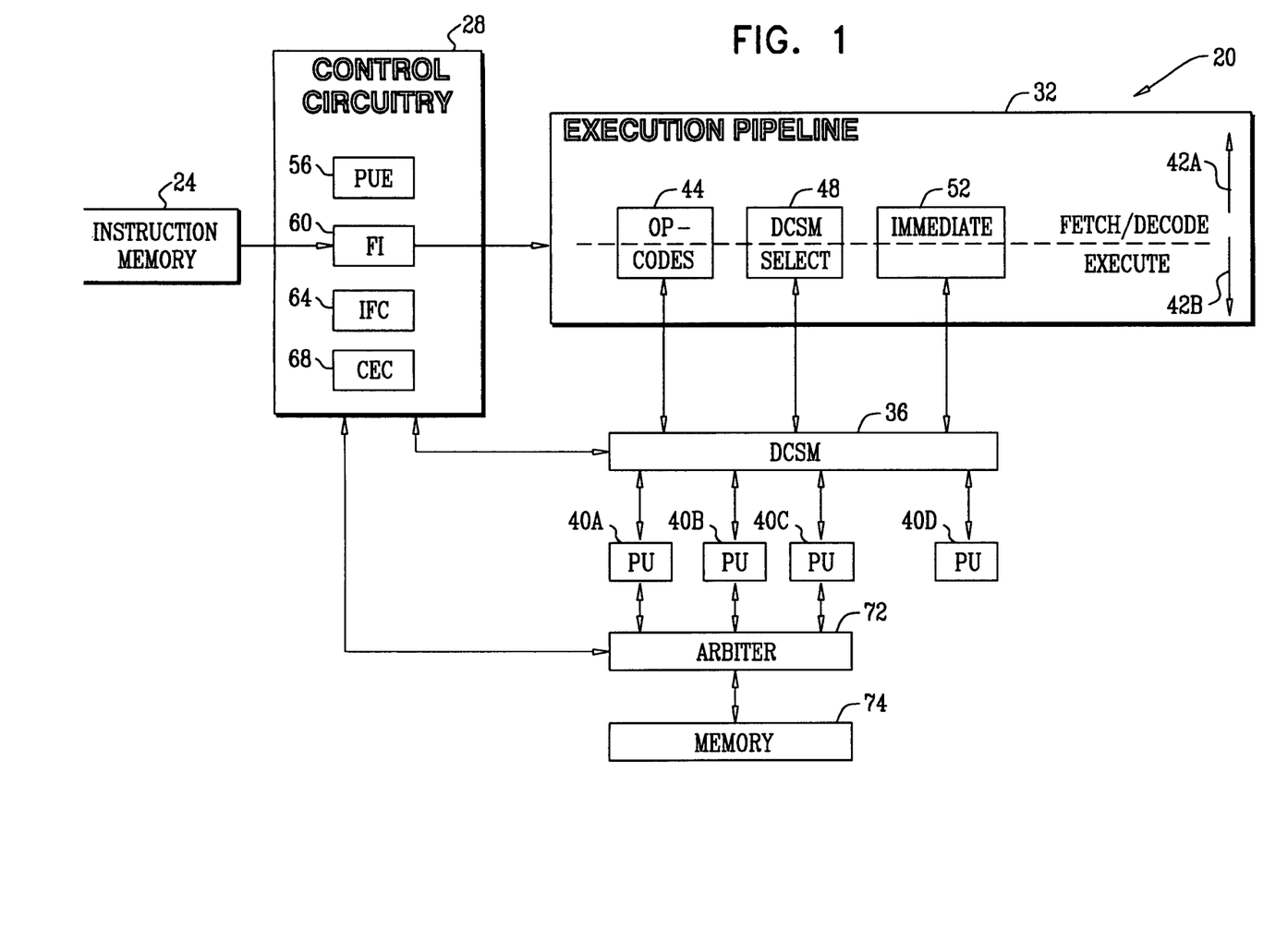
FIG. 1 is a block diagram that schematically illustrates a processor, in accordance with an embodiment of the present invention.

FIG. 1 is a block diagram that schematically illustrates a processor 20, in accordance with an embodiment of the present invention. The methods and systems described herein are particularly beneficial in computational tasks that perform a given series of operations on an entire data vector or array. This kind of task is common in Digital Signal Processing (DSP) in general, and particularly (although not exclusively) in baseband processing in Orthogonal Frequency Division Multiplexing (OFDM) and Orthogonal Frequency Division Multiple Access (OFDMA) systems.

In the present example, processor 20 comprises a Very Large Instruction Word (VLIW) processor that is used for performing DSP functions in a wireless communication system that operates in accordance with the IEEE 802.16 standard, known as WiMAX. Alternatively, however, processor 20 may be used in a communication system that carries out any other suitable communication standard or protocol, such as Long Term Evolution (LTE), eXtended Global Platform (XGP), WiFi, Global System for Mobile communications (GSM), EDGE, Code Division Multiple Access 2000 (CDMA2000), EVolution-Data Only (EVDO), Wideband CDMA (WCDMA), Time-Division Synchronous CDMA (TD-SCDMA), High Speed Packet Access (HSPA) or Personal Handy-phone system (PHS). Further alternatively, processor 20 may comprise any other suitable processor that may be used for performing any other suitable function.

Processor 20 executes program instructions that are stored in an instruction memory 24. The instructions are provided, via control circuitry 28 that will be described further below, to an execution pipeline 32. The execution pipeline comprises two or more pipeline stages 42, which fetch, decode and execute the program instructions. In the embodiment of FIG. 1, processor 20 comprises two pipeline stages denoted 42A and 42B. Pipeline stage 42A fetches and decodes the program instructions, and pipeline stage 42B executes them. The pipelined architecture enables the program instructions to be processed and executed in an efficient manner. In a given clock cycle, pipeline stage 42B executes a certain instruction while pipeline stage 42A simultaneously fetches and decodes the next instruction.

The program instructions specify operations that are to be performed by processor 20, such as arithmetic operations, data movement operations, flow control operations or any other suitable operations. Processor 20 comprises multiple Processing Units (PUs) 40, which perform the operations specified in the program instructions and/or temporarily store data (e.g. general-purpose registers). FIG. 1, for example, shows four PUs denoted 40A . . . 40D. Different PUs may have similar or different designs and configurations. Typically, each program instruction specifies multiple operations to be performed by multiple, respective PUs.

The PUs are configured and controlled by a Data and Control Switching Mesh (DCSM) 36. The DCSM typically comprises a set of multiplexers, which interconnect the inputs and outputs of the different PUs in accordance with a certain interconnection setting. The interconnection setting that is applied during execution of a given program instruction is specified in the instruction. When executing a given instruction, the output of execution pipeline 32 is provided to DCSM 36, possibly together with certain outputs of the control circuitry that will be addressed in detail further below and with the output of the PUs. The DCSM configures the different PUs, interconnects the inputs and outputs of the PUs, and provides data to the PUs, as specified in the program instruction output by pipeline 32. In other words, the execution pipeline causes the PUs to perform the operations specified in the program instructions. The functions of PUs 40 and DCSM 36 are addressed in greater detail further below. In some embodiments, DCSM 36 provides information to control circuitry 28, such as branch information to IFC 64, condition information to CEC 68 and instruction information.

In the present example, each program instruction comprises three parts: (1) op-codes of the operations to be performed by the PUs, (2) a DCSM configuration setting, and (3) data provided to the DCSM for executing the instruction. Each pipeline stage comprises three units, which process the three parts of the program instruction, respectively. An op-code processing unit 44 processes the command op-codes, a DCSM selection unit 48 processes the DCSM setting, and an immediate unit 52 processes the data to be provided to the DCSM. (Although the configuration of FIG. 1 refers to a dual-stage pipeline, the methods and systems described herein can be used with any other suitable execution pipeline having any other suitable number of pipeline stages and division of functions among the stages.)

Control circuitry 28 comprises a Fetch Indicator (FI) 60, which loads program instructions from memory 24. An Instruction Flow Controller (IFC) 64 manages the program flow, e.g., advancing the address of program instructions, handling of branch instructions and other Program Counter (PC) related tasks. In particular, IFC 64 produces and outputs the PC value that is used for fetching the next program instruction. A Processing Unit Enabler (PUE) 56 produces enable/disable signals to the different elements of processor 20.

A Conditional Execution Controller (CEC) 68 performs conditional enabling, disabling and configuration of PUs 40, based on operand comparison. In a given clock cycle, CEC 68 compares two operands and, based on the comparison result, translates a set of input control signals to a set of output control signals that control (e.g., enable, disable, interconnect or configure) the PUs. Typically, the PUE and CEC operate together to configure and control the PUs using the DCSM. PUE 56 typically decides which PUs are to be enabled in a given instruction cycle based on data conveyed in the instruction and on information provided by CEC 68.

In some embodiments, processor 20 further comprises an arbiter 72, which enables multiple PUs to access processor resources (e.g., a memory 74) in the same instruction cycle without deadlock. The arbiter functionality is addressed in greater detail below. In some embodiments, arbiter 72 may also manage the access of other elements, external to processor 20, which compete together with PUs 40 for access to the resource in question.

Although the embodiment of FIG. 1 addresses a certain processor configuration, this choice is made purely by way of example. The principles of the present invention are in no way limited to this configuration, and can be used with any other suitable configuration. Some elements of processor 20, which are not mandatory for demonstrating the disclosed techniques, were omitted for the sake of clarity.

Reducing Power Consumption by Selective Fetching of Program Instructions

In many processor architectures, fetching instructions from instruction memory 24 draws a considerable amount of electrical power. The power consumed by these instruction fetch operations often becomes the dominant factor in the overall power consumption of the processor, especially in processors having large instruction widths.

Embodiments of the present invention that are described herein provide methods and systems for reducing the number of instructions that are fetched from the instruction memory. The methods and systems described herein are based on the fact that, since the processor has a pipelined architecture, an instruction that is currently intended for fetching may already be present in the execution pipeline. Such an instruction may be reused within the pipeline without fetching it again from the instruction memory.

This scenario is common, for example, when the processor executes program loops that are shorter than the pipeline depth (i.e., when the number of instructions in the loop is smaller than the number of pipeline stages). When executing the second or higher iteration of such a loop, instances of program instructions from previous loop iterations are already present in the pipeline. Thus, the processor may reuse these previous instruction instances within the pipeline without having to access the instruction memory.

The processor may reuse a given instruction, for example, by copying it back to the pipeline input, or by holding the instruction in the pipeline for an additional clock cycle (i.e., preventing the pipeline from shifting the instruction). In either case, reusing an instruction within the pipeline draws only a fraction of the power needed for fetching the instruction from the instruction memory or from cache. As such, the methods and systems described herein considerably reduce the overall power consumption of the processor. Although the methods and systems described herein are optimized for large instruction word DSPs, they can be advantageous in various other kinds of processors.

In the example embodiment of FIG. 1, pipeline 32 has two stages. In this configuration, processor 20 can execute single-instruction loops without repeatedly accessing the instruction memory. (The instruction memory is typically accessed when executing the first loop iteration. Subsequent loop iterations reuse the instruction that is already present in the pipeline.)

In the case of two pipeline stages, control circuitry 28 can reuse an instruction by causing the instruction to remain in the same position in the pipeline for an additional clock cycle, and inhibiting the processor from fetching the instruction from the instruction memory. Inhibiting the instruction fetch consumes considerably less power than repeatedly fetching the same instruction from the same address of the instruction memory.

In some embodiments, each program instruction comprises a flag, which indicates whether or not the instruction is part of a single-instruction loop. Based on this flag, IFC 64 produces a control signal indicating that (1) the current instruction is part of a single-instruction loop and (2) the current loop iteration is the second or higher iteration. In response to this signal, PUE 56 inhibits FI 60 from fetching the instruction from the instruction memory, and causes pipeline 32 to retain the instruction in the same position for an additional clock cycle (often in addition to shifting the instruction along the pipeline). As a result, the instruction is re-executed without repeatedly accessing the instruction memory. The technique of retaining the pipeline content for an additional clock cycle further reduces power consumption since it minimizes switching in the processor's control circuitry.

In alternative embodiments, control circuitry 28 may comprise a hardware mechanism (not shown in the figure) for copying (looping-back) instructions back to the input of the pipeline, so as to re-execute the instructions without re-fetching them from instruction memory 24. Further alternatively, control circuitry 28 may identify instructions that can be reused within the pipeline without the use of dedicated control signals that mark program loops. For example, the control circuitry may compare the program address (PC value) of the next instruction to the program addresses of the instructions already in the pipeline.

Figure 2:
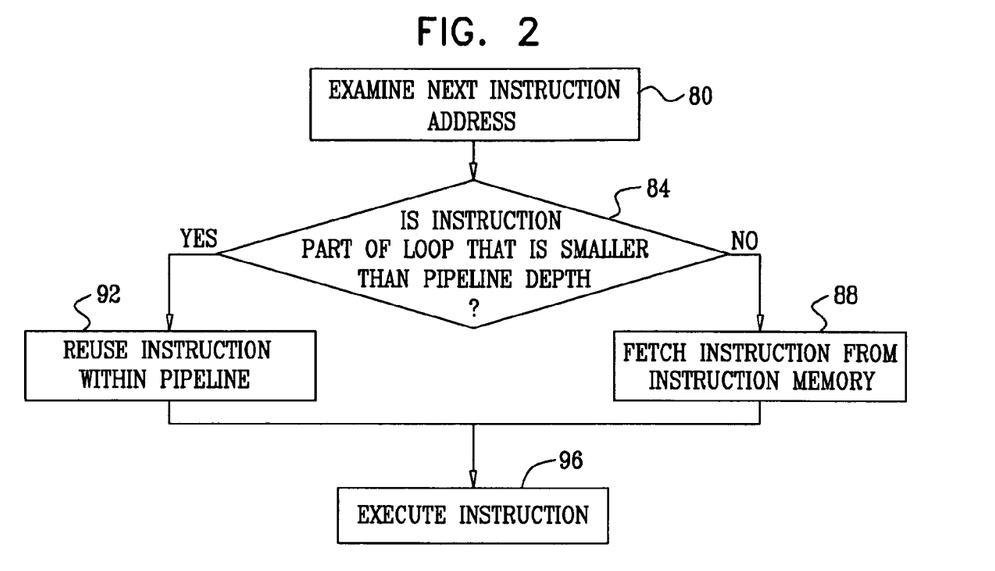
FIG. 2 is a flow chart that schematically illustrates a method for selective fetching of program instructions in a processor, in accordance with an embodiment of the present invention.

FIG. 2 is a flow chart that schematically illustrates a method for selective fetching of program instructions in a processor, in accordance with an embodiment of the present invention. The method begins with control circuitry 28 examining the address of the next program instruction intended for fetching, at an instruction examining step 80. The control circuitry (e.g., IFC 64) checks whether the instruction is part of the second or higher iteration of a loop that is shorter than the pipeline depth, at a checking step 84. (A loop that is shorter than the pipeline depth is referred to herein as a short loop for brevity.)

If the instruction is not part of the second or higher iteration of a short loop, the control circuitry (typically FI 60) fetches the instruction from instruction memory 24, at an external fetching step 88. If, on the other hand, the instruction is part of the second or higher iteration of a short loop, the control circuitry reuses the instruction within the pipeline, at a reusing step 92. In either case, pipeline 32 processes the instruction, and the instruction is provided to PUs 40 via DCSM 36 for execution, at an execution step 96.

Although the embodiments described herein mainly address instructions that are part of short program loops, the methods and systems described herein can also be used in any other scenario in which an instruction intended for fetching is already present in the pipeline.

Techniques for Implementing Short Program Loops

As noted above, reusing instructions within the execution pipeline is particularly useful in executing short program loops. In some embodiments, processor 20 comprises additional features and mechanisms that enable various types of software tasks to be coded using short loops. Using these mechanisms, a larger portion of a given software task can be coded using short program loops. The reduction in power consumption, enabled by the methods disclosed above, can thus be applied to a larger portion of the software task.

For example, operating multiple PUs in parallel (as in processor 20 in FIG. 1) enables "flattening" of loops, i.e., writing short program loops in which each instruction is distributed among multiple PUs. In some embodiments, this capability is enhanced by the flexible configuration of PUs 40, which is carried out by DCSM 36. In some embodiments, one or more attributes of any PU 40 are configurable according to a condition that is defined over the data output by one or more of PUs 40. Typically, each PU can be configured separately and independently of other PUs. Configurable PU attributes may comprise, in a given instruction cycle, activation or deactivation of the PU, selection of one or more sources of data input to the PU, selection of an operation to be performed by the PU from among multiple operations that are supported by the PU, and/or any other suitable attribute.

The flexible PU configuration mechanism described above provides the ability to represent nested loops and long loops using equivalent short loops (i.e., loops whose length is shorter than the depth of the execution pipeline of the processor). The resulting short loops can then be implemented by reusing instructions that are already present in the execution pipeline, as described above, thus reducing power consumption.

For example, consider a software task that is conventionally formulated as a nested loop having an inner loop and an outer loop. The inner loop is assumed to have M instructions. When using multiple PUs in parallel, the nested loop can be equivalently coded as a short single loop, in which each instruction specifies multiple operations to be performed by multiple respective PUs. In the equivalent representation, the PUs are configured to execute the operations of the outer loop conditionally—once every M iterations. This method is particularly beneficial when the number of inner loops iterations is small and the number of outer loop iterations is large.

Generally, operating multiple configurable PUs in parallel provides the ability to write loops that specify long sequences of operations as short loops, since each instruction may specify multiple operations to be performed by the PUs. Variations among the different operations in the sequence (e.g., variations in indices or variable values) can be represented by conditional configuration of the different PUs.

Additionally or alternatively, the ability to write software tasks as short loops can be enhanced by enabling each PU to hold an internal data vector, and to access and process successive elements of the vector in each clock cycle, in a cyclical manner. For example, many filtering tasks that are encountered in communication and signal processing applications involve filtering (convolving) a sampled signal by a vector of filter coefficients (e.g., a Finite Impulse Response (FIR) filter) in a cyclical manner. Storing the data vector internally in the PU, instead of in external memory, considerably reduces the number of memory access operations requested by the PUs. Since memory access resources are usually expensive and therefore limited, reducing them enables the filtering task to be coded using a considerably shorter loop.

Figure 3:
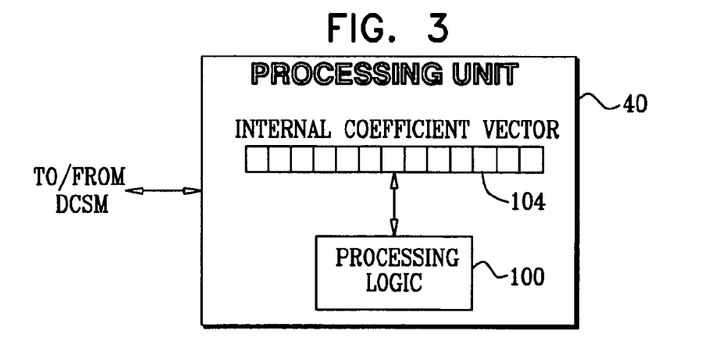
FIG. 3 is a block diagram that schematically illustrates a Processing Unit (PU) of a processor, in accordance with an embodiment of the present invention.

FIG. 3 is a block diagram that schematically illustrates PU 40, in accordance with an embodiment of the present invention. In the present example, PU 40 comprises processing logic 100 and an internal memory, which holds a coefficient vector 104. Vector 104 comprises multiple elements, such as filter coefficients. The coefficient vector may be specified, for example, by one or more previous program instructions or by external configuration. In a given clock cycle, the processing logic advances from one vector element to the next in a cyclical manner, performs a given operation (e.g., multiplication) and outputs the operation result to the DCSM.

Since the vector elements need not be fetched from external memory, the need for memory access resources is considerably reduced, especially when the task performed requires loading of multiple inputs and memory access resources are limited. Consequently, the filtering operation can be coded using a considerably shorter loop, and can therefore be implemented by reusing instructions that are already present in the execution pipeline of the processor, leading to considerable reduction in power consumption.

The above-mentioned mechanisms (flattening of nested loops, handling of coefficient vectors) can be combined with one another in various ways. For example, if vector 104 is to be advanced only once every n operations, the vector can be advanced in an external loop by defining an instruction that advances the vector conditionally based on the value of an internal loop.

Further additionally or alternatively, the ability to code software tasks using short loops can be enhanced by configuring one or more of the PUs to function as delay elements. When performing a certain sequential process (i.e., a process in which the output of a certain PU is used as input to another PU), such delay elements enable given data to be used at various stages of the process without the need to re-fetch the data from memory. As explained above, reducing the need for memory access resources enables considerable reduction in loop size. In some embodiments, the delay elements are pipelined. In other words, during the time interval between receiving input data n and producing the respective delayed output, a pipelined delay element having a delay d may sequentially store data inputs n+1, n+2, . . . ,to n+d−1, thus increasing its effectiveness in a single-instruction loop.

Figure 4:
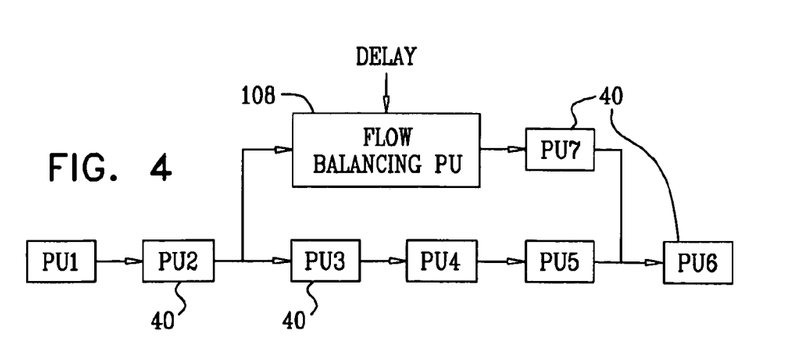
FIG. 4 is a block diagram that schematically illustrates a PU configuration, in accordance with an embodiment of the present invention.

FIG. 4 is a block diagram that schematically illustrates a PU configuration, in accordance with an embodiment of the present invention. In the present example, six PUs denoted PU1 . . . PU6 are configured to perform a certain sequential process. Each of these PUs uses the output of the previous PU as input. In addition, PU6 accepts as input the output of another PU, denoted PU7. PU7 operates on the output of PU2.

A flow balancing PU 108 is configured to introduce a controlled delay to the output of PU2, before providing it as input to PU7. The delay of flow balancing PU 108 is set so that the overall delay of PU 108 and PU7 is equal to the overall delay of PU3, PU4 and PU5. By using the flow balancing PU, the output of PU2 can be used as input to both PU3 and PU7, even though the data is needed at different clock cycles. Without the flow balancing feature, the output of PU2 would have to be stored in memory, and then fetched at the appropriate time for providing it to PU7. As explained above, reducing the number of memory access operations contributes to the ability to code software tasks using shorter loops.

The flow balancing PU may comprise one of PUs 40, which is configured to introduce the desired delay. The PU configuration in a given instruction may configure any desired number of PUs to serve as flow balancing PUs. Additionally or alternatively, processor 20 may comprise one or more flow balancing PUs, which are dedicated for this particular function. The delay introduced by PU 108 can be specified by the program instruction, or by external configuration.

When deploying multiple PUs in parallel, two or more of the PUs may request access to the same processor resource (e.g., memory 74 in FIG. 1) in the same program instruction. In some embodiments, arbiter 72 of FIG. 1 above resolves such multiple requests without deadlock. The deadlock-free operation provided by arbiter 72 enables PUs 40 to operate concurrently, without a need to split requests to the same resource between different instructions. As a result, the ability to code software tasks using short loops is enhanced considerably.

Figure 5:
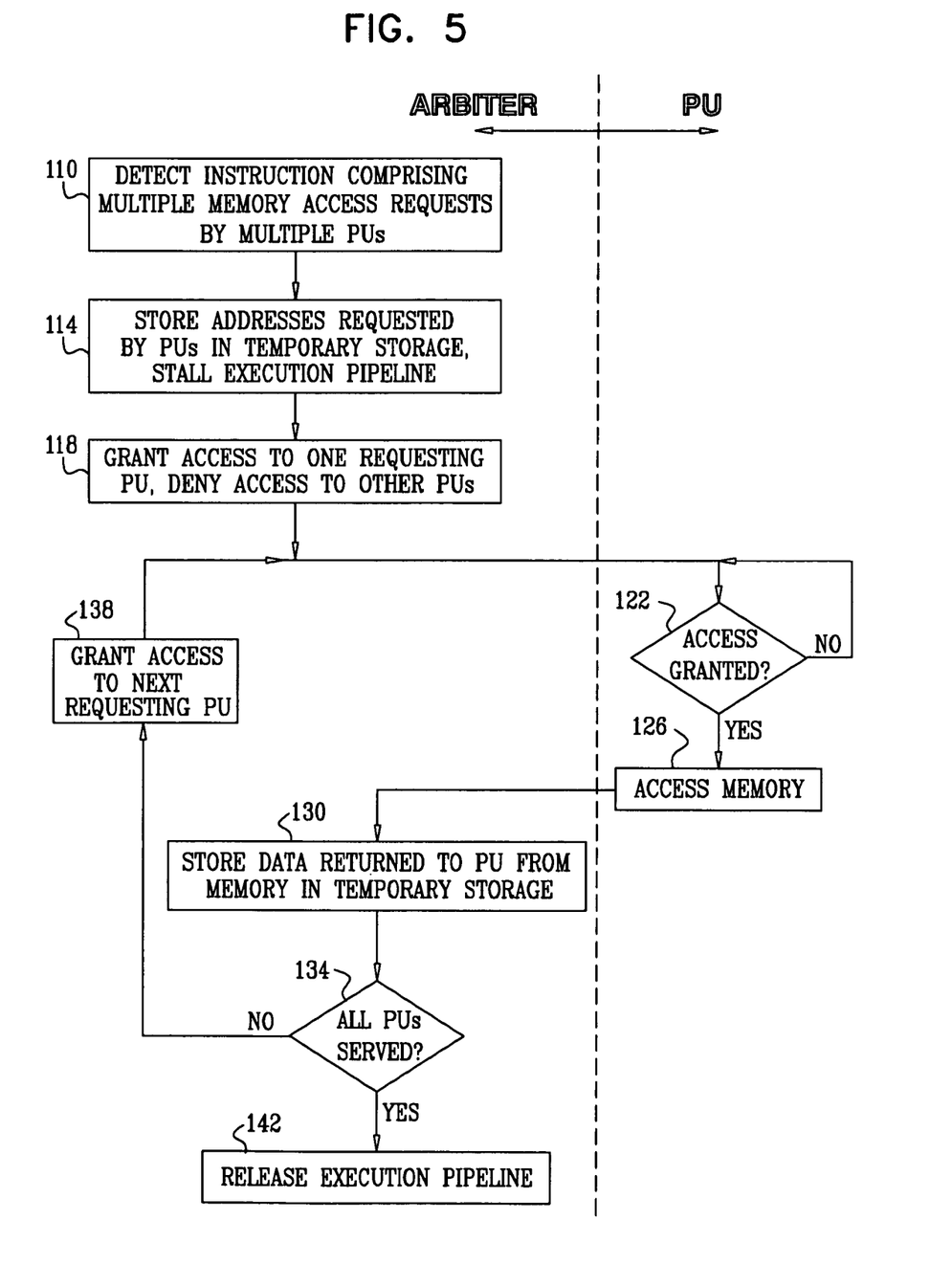
FIG. 5 is a flow chart that schematically illustrates a method for arbitration in a processor having multiple PUs, in accordance with an embodiment of the present invention.

FIG. 5 is a flow chart that schematically illustrates a method for deadlock-free arbitration in processor 20 having multiple PUs 40, in accordance with an embodiment of the present invention. In the method of FIG. 5, arbiter 72 of FIG. 1 controls the access to a given resource by multiple competing elements. The resource may comprise a memory or any other suitable kind of resource. As noted above, the competing elements may comprise one or more PUs 40 and/or one or more elements external to processor 20. In a specific implementation, such external competing elements may comprise PUs of another processor similar to processor 20.

The method is based on a mechanism, in which each competing PU 40 is assigned a temporary storage space for storing the address of requested memory access operations, and for storing the data returned to the PU by the memory access operations. The temporary storage space (e.g., registers) may reside either in the individual PUs, in arbiter 72, or at any other suitable location.

The description that follows refers to multiple PUs, which compete for access to a memory resource. When accessing the memory resource in order to perform a certain memory access operation, a given PU specifies the requested memory address. After performing the memory access operation, data is returned from the memory to the PU. In alternative embodiments, however, the method of FIG. 5 can be used with various other sorts of shared resources, such as a processing engine that can be accessed by processor 20 and by other processors. In general, each PU accessing the shared resource specifies certain information for performing the requested operation, and the resource returns certain data as a result.

The method of FIG. 5 begins with arbiter 72 detecting a program instruction in which multiple PUs request access to a given memory resource, at an instruction arbitration step 110. The instruction in question comprises multiple requests for performing memory access operations by the multiple respective PUs, with each request specifying a corresponding memory address. The arbiter stores the addresses requested by the different PUs in the temporary storage space, and stalls execution pipeline 32, at a stalling step 114. Pipeline stalling can be performed before, after or concurrently with storage of the addresses. The arbiter grants access to the memory to all but one of the requesting PUs, at an access granting step 118.

Each requesting PU checks whether it was granted access to the memory, at a grant checking step 122. Once a given PU was granted access, the PU accesses the memory and performs the requested operation, at an accessing step 126. The memory access operation in question returns certain data.

The arbiter stores the data returned to the PU by the memory access operation in the temporary storage space, at a returned data storage step 130. The arbiter checks whether all requesting PUs have been served, at a termination checking step 134. If not all PUs have been served, the arbiter grants exclusive access to the memory resource to another PU that was not yet served, at an access re-granting step 138. The method then loops back to step 122 above, and the PU to which access was granted accesses the memory. When all requesting PUs have been served, the arbiter releases the execution pipeline, at a pipeline releasing step 142.

As noted above, the arbitration scheme of FIG. 5 can be generalized in a straightforward manner for various types of shared resources and operations performed on such resources. In general, the arbiter stores in the temporary storage information provided by the PUs in order to perform the requested operation. After performing the operation, the arbiter stores data returned from the resource (typically a result of the operation) in the temporary storage space.

The arbitration process of FIG. 5 is an exemplary process, which was chosen purely by way of example. In alternative embodiments, processor 20 may apply various other deadlock-free arbitration schemes in which (1) temporary storage space is provided per PU for the requested address (or other information needed for performing the operation) and for the returned data, (2) the requested addresses are held as long as memory access is denied, and (3) the returned data is held at least from the moment access is granted until the execution pipeline is released.

The arbitration schemes described herein provide deadlock-free access to shared resources among any desired number of PUs, which contend for the resource in a single instruction line. Moreover, the disclosed arbitration schemes allow multiple processors 20 to compete for a shared resource without risk of a deadlock.

Although the embodiments described herein mainly address Very Long Instruction Word (VLIW) processors that perform signal processing functions in wireless communication systems, the principles of the present invention can also be used in other processors and other applications, such as in Network Processors (NP), which operate on long data streams.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A Very Long Instruction Word (VLIW) processor, comprising:
multiple processing units;
an execution pipeline, which comprises at least first and second pipeline stages that are cascaded so that program instructions, specifying operations to be performed by the processing units in successive cycles of the pipeline, are fetched from a memory by the first pipeline stage and conveyed to the second pipeline stage, which causes the processing units to perform the specified operations; and
control circuitry, which is coupled to determine when a VLIW program instruction currently being fetched, decoded or executed in a stage of the execution pipeline in a first cycle of the pipeline is to be executed again in a subsequent cycle of the pipeline, to cause the execution pipeline to hold the program instruction in the first pipeline stage for reuse in the subsequent cycle, if the determined instruction is in the first stage of the pipeline, and if the determined instruction is in a subsequent stage of the pipeline, to copy the instruction from the pipeline stage in which it is currently being fetched, decoded or executed, for reuse.

2. The processor according to claim 1, wherein the execution pipeline comprises N pipeline stages, and wherein the control circuitry is coupled to determine that the program instruction is to be executed again by determining that a program loop currently being executed has less than N program instructions.

3. The processor according to claim 1, wherein the control circuitry is coupled to cause the execution pipeline to copy or hold the program instruction by inhibiting the execution pipeline from fetching the program instruction from the memory.

4. The processor according to claim 1, wherein the multiple processing units operate concurrently with one another, wherein each given program instruction specifies a configuration of the multiple processing units to be applied when executing the given program instruction, and comprising interconnection circuitry, which is coupled to configure the multiple processing units in each given program instruction responsively to the respective configuration.

5. The processor according to claim 4, wherein the interconnection circuitry is coupled to sense an output of one or more of the processing units, and to configure the multiple processing units responsively to a condition that is defined over the sensed output.

6. The processor according to claim 4, wherein the interconnection circuitry is coupled to configure a given processing unit by setting at least one attribute selected from a group of attributes consisting of activation/deactivation of the given processing unit, selection of one or more sources of data input to the given processing unit, and selection of an operation to be performed by the given processing unit.

7. The processor according to claim 1, wherein at least one of the processing units comprises:
an internal memory holding an internal data vector comprising multiple elements; and
processing logic, which is coupled to cycle over the vector elements and to operate on the cycled vector elements.

8. The processor according to claim 1, wherein at least one of the processing units comprises an input and an output, and is coupled to accept data at the input, to delay the data and to produce the delayed data at the output for processing by another processing unit.

9. The processor according to claim 1, and comprising:
temporary storage memory; and
arbitration circuitry, which is coupled to stall the execution pipeline responsively to identifying a given program instruction containing two or more requests by respective two or more processing elements to access a given resource, to store in the temporary storage memory respective data specified by the requests, to allow the two or more processing elements to access the given resource while the execution pipeline is stalled, and to store in the temporary storage memory respective results returned from the resource in response to the requests.

10. The processor according to claim 9, wherein the resource comprises a shared memory.

11. The processor according to claim 9, wherein the processing elements comprise one or more of the processing units.

12. The processor according to claim 9, wherein one or more of the requests are received from one or more external processing elements that are external to the processor.

13. A computing method, comprising:
operating one or more processing units;
operating an execution pipeline, which includes at least first and second pipeline stages that are cascaded so that program instructions, specifying operations to be performed by the processing units in successive cycles of the pipeline, are fetched from a memory by the first pipeline stage and conveyed to the second pipeline stage, which causes the processing units to perform the specified operations;
determining that a Very Long Instruction Word (VLIW) program instruction is currently being fetched, decoded or executed in a stage of the execution pipeline in a first cycle of the pipeline and is to be executed again in a subsequent cycle of the pipeline; and
causing the execution pipeline to hold the instruction in the first pipeline stage, if the determined instruction is in the first stage of the pipeline and to copy the determined program instruction from the pipeline stage in which it is currently being fetched, decoded or executed, for reuse, if the determined instruction is in a subsequent stage of the pipeline.

14. The method according to claim 13, wherein the execution pipeline includes N pipeline stages, and wherein determining that the program instruction is to be executed again comprises determining that a program loop currently being executed has less than N program instructions.

15. The method according to claim 13, wherein causing the execution pipeline to copy or hold the program instruction comprises inhibiting the execution pipeline from fetching the program instruction from the memory.

16. The method according to claim 13, wherein the multiple processing units operate concurrently with one another, wherein each given program instruction specifies a configuration of the multiple processing units to be applied when executing the given program instruction, and wherein operating the processing units comprises configuring the multiple processing units in each given program instruction responsively to the respective configuration.

17. The method according to claim 16, wherein configuring the multiple processing units comprises sensing an output of one or more of the processing units, and configuring the processing units responsively to a condition that is defined over the sensed output.

18. The method according to claim 16, wherein configuring the multiple processing units comprises, for a given processing unit, setting at least one attribute selected from a group of attributes consisting of activation/deactivation of the given processing unit, selection of one or more sources of data input to the given processing unit, and selection of an operation to be performed by the given processing unit.

19. The method according to claim 13, wherein at least one of the processing units includes an internal memory holding an internal data vector that includes multiple elements, and wherein operating the processing units comprises cycling over the vector elements and operating on the cycled vector elements.

20. The method according to claim 13, wherein at least one of the processing units has an input and an output, and wherein operating the processing units comprises configuring the at least one of the processing units to accept data at the input, to delay the data and to produce the delayed data at the output for processing by another processing unit.

21. The method according to claim 13, wherein operating the processing units comprises:
  stalling the execution pipeline responsively to identifying a given program instruction containing two or more requests by respective two or more processing elements to access to a given resource;
  storing in a temporary storage memory respective data specified by the requests;
  allowing the two or more processing elements to access the given resource while the execution pipeline is stalled; and
  storing in the temporary storage memory respective results returned from the resource in response to the requests.

22. The method according to claim 21, wherein the resource comprises a shared memory.

23. The method according to claim 21, wherein the processing elements comprise one or more of the processing units.

24. The method according to claim 21, wherein the processing units and the execution pipeline are comprised in a processor device, and wherein one or more of the processing elements is external to the processor device.

25. The method according to claim 13, wherein each pipeline stage is configured to perform a handling task on a program instruction in the stage.

26. The method according to claim 13, wherein causing the execution pipeline to fetch the program instruction comprises causing the execution pipeline to copy or hold the program instruction without re-fetching the VLIW program instruction from outside the execution pipeline.

27. The method according to claim 13, wherein determining that the program instruction is to be executed again comprises checking a flag associated with the instruction, which flag indicates whether the instruction is part of a loop.

28. The method according to claim 13, wherein determining that the program instruction is to be executed again comprises comparing a program address of a next instruction to a program address of an instruction in the pipeline.

29. The processor according to claim 1, wherein the control circuitry is configured to copy or hold the program instruction without re-fetching the VLIW program instruction from outside the execution pipeline.

30. The processor according to claim 1, wherein the control circuitry is coupled to determine that a program instruction is to be executed again by checking a flag associated with the instruction, which flag indicates whether the instruction is part of a loop.

31. The processor according to claim 1, wherein the control circuitry is coupled to determine that a program instruction is to be executed again by comparing a program address of a next instruction to a program address of an instruction in the pipeline.

32. The processor according to claim 1, comprising multiplexers, which interconnect inputs and outputs of the multiple processing units, in accordance with settings in the program instructions.

* * * * *